Figure 1:
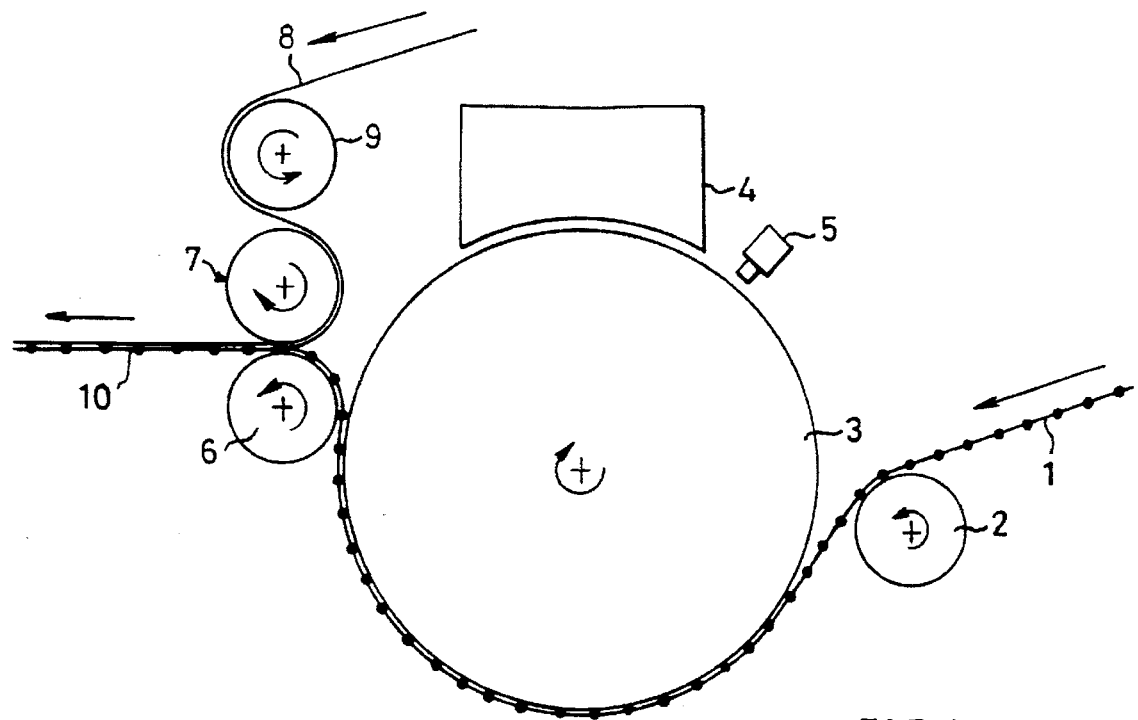

United States Patent [19]

Wrigley et al.

[11] Patent Number: 5,651,853
[45] Date of Patent: Jul. 29, 1997

[54] MESH STRUCTURE/FABRIC LAMINATE

[75] Inventors: Nigel Edwin Wrigley, Blackburn; Brian Orr, Preston, both of England

[73] Assignee: P.L.G. Research Limited, Blackburn, United Kingdom

[21] Appl. No.: 456,689

[22] Filed: Jun. 1, 1995

Related U.S. Application Data

[63] Continuation-in-part of Ser. No. 394,010, Feb. 23, 1995, abandoned.

[30] Foreign Application Priority Data

Dec. 2, 1994 [GB] United Kingdom .................. 9424394
May 4, 1995 [GB] United Kingdom .................. 9509132

[51] Int. Cl.[6] ............................ B32B 31/20; B32B 31/26
[52] U.S. Cl. .................. 156/290; 156/309.6; 156/309.9; 156/553
[58] Field of Search ........................... 156/290, 308.4, 156/309.6, 309.9, 553, 582

[56] References Cited

U.S. PATENT DOCUMENTS

| | | |
|---|---|---|
| 2,919,467 | 1/1960 | Mercer . |
| 3,249,129 | 5/1966 | Renfroe .................. 139/426 R |
| 3,252,181 | 5/1966 | Hureau . |
| 3,758,371 | 9/1973 | Lang ....................... 156/290 |
| 4,374,798 | 2/1983 | Mercer . |
| 4,473,432 | 9/1984 | Leader .................... 156/582 |
| 4,919,738 | 4/1990 | Ball ........................ 156/290 |
| 5,053,264 | 10/1991 | Beretta . |
| 5,131,966 | 7/1992 | Coffey ..................... 156/296 |
| 5,152,633 | 10/1992 | Mercer et al. ............. 428/198 |
| 5,273,804 | 12/1993 | Mercer et al. ............. 428/138 |

Primary Examiner—Daniel Stemmer
Attorney, Agent, or Firm—Jacobson, Price, Holman & Stern, PLLC

[57] ABSTRACT

In order to laminate a fabric to a plastics material grid formed of oriented strands connected by junctions having thicker and non-oriented or less-oriented nodes, the fabric and the grid having the same melting temperature, the grid is heated by a drum to melt the surfaces of the nodes, and the grid and the fabric are passed through a nip formed by nip rollers, the fabric having been pre-heated by passing around a preheat roller. One nip roller has surface protuberances formed by knurling of such a size that a number of protuberances engage (by way of the fabric) each node of the grid.

17 Claims, 1 Drawing Sheet

MESH STRUCTURE/FABRIC LAMINATE

This application is a continuation-in-part of application Ser. No. 08/394,010, filed Feb. 23, 1995, now abandoned, the subject matter of which is incorporated herein in its entirety by reference.

BACKGROUND OF THE INVENTION

The present invention relates to a method of making a laminate, comprising: providing a plastics material mesh structure such as a grid or geogrid or a net having oriented strands connected together by thicker and non-oriented or less-oriented portions; providing a fabric for lamination to the mesh structure; heating the surfaces of said thicker portions to soften or melt the surfaces; passing the mesh structure and the fabric through a nip formed by a nip member and a backing member, to cause the softened or melted plastics material of said thicker portions to penetrate into the fabric; and cooling the laminate so formed. The invention also relates to the laminate itself and to the laminating machine.

Such a method and laminate are described in U.S. Pat. No. 5,152,633 (Mercer et al). In the procedure described, the mesh structure and the fabric are passed between two rollers which provide an initial nip. There is however a tendency for the rollers to squeeze the plastics material backwards away from its initial position by what can be termed the "cherry stone effect". This reduces the thickness of the plastics material available for penetration into the fabric and reduces the strength of the bond between the mesh structure and the fabric.

In the procedure shown in U.S. Pat. No. 5,152,633, the heat is applied to the mesh structure through the fabric, and the danger of shrinking the fabric is avoided by choosing a fabric with a higher softening or melting temperature than the surfaces of said thicker portions. However, it is in certain cases desirable to use a fabric with a similar or lower softening or melting temperature than that of said surfaces.

The oriented strands of the mesh structure should not be heated so much that they de-orient; for some applications such as reinforcing asphalt, it is undesirable that the strands should adhere to the fabric.

The expression "soften or melt" is used herein. Plastics materials soften very significantly before their melting point and may have an indefinite melting point. It is not essential that the plastics material be molten in order to penetrate into the fabric, though it is understood that it must be sufficiently soft.

The Invention

According to the present invention, the nip member has surface protuberances which engage the opposite face of the fabric to that face of the fabric which engages the mesh structure, in general at least one protuberance engaging (by way of the fabric) substantially each said thicker portion of the mesh structure where bonding is required. Preferred or optional features of the invention will be apparent hereafter. The invention extends to the laminate made by the method of the invention and to a laminating machine arranged to carry out the method of the invention.

Using the invention, the protuberances engage said thicker portions of the mesh structure and retain the softened or melted plastics material generally in place on the thicker portions, press the fabric into the softened or molten surface of each thicker portion, and may indent the fabric. This can partly or wholly avoid the occurrence of the cherry-stone effect, because the softened or molten plastics material is trapped between the protuberances as well as not being squeezed off the thicker portion. Without the fabric present, the protuberances would embed themselves fully in the softened or molten plastics material and the grooves between the protuberances would fill up with softened or molten plastics material. When the fabric is present, the tip of each protuberance presses the fabric hard into the softened or molten plastics material but also the fabric between pairs of protuberances is tensioned across the pool of softened or molten plastics material and therefore the softened or molten plastics material, in order to pass into the space of the grooves, has to do so through the fabric. This ensures the maximum possible enrobement of the fabric fibres by the plastics material, as opposed to merely adhering the fabric to the mesh structure. In other words, due to the plastics material being held by the protuberances, there is a greater thickness of plastics material available for penetration into the fabric and the bond strength is significantly improved. Thus the invention enables one to laminate a fabric to a mesh structure by joining the two layers discretely only at the nodes of the mesh structure, without the addition of another material such as a hot melt or adhesive.

The protuberances are preferably discontinuous as seen in section in the machine direction. The protuberances are preferably in the form of discrete, small protuberances, conveniently of the type known as knurling. Preferably the protuberances are of pyramid shape. However, any form of protuberance, provided it is regular and accurate, is usable, such as axial ridges formed by transverse grooves (parallel to the axis of a nip roller), or longitudinal (circumferential) ridges or helical ridges. The tip area of each protuberance in engagement (by way of the fabric) with a said thicker portion is preferably significantly smaller than the area of softened or molten plastics material on the thicker portion. The size and spacing of the protuberances is preferably such that a plurality of the protuberances will engage (by way of the fabric) substantially each said thicker portion of the mesh structure. For instance: if said area is 20 mm×20 mm, the protuberance pitch is preferably not less than about 1 mm; if said area is ½ mm×½ mm, the protuberance pitch is preferably about 0.1 mm to about 0.2 mm. Such protuberances engage firmly with only a small portion of the surface area of the thicker portion. This ensures that at these points, the fabric is very strongly pressed into the softened or molten plastics material and it also ensures that the main pool of softened or molten plastics material is kept in contact with the fabric to ensure maximum engagement. It is possible that a single contact point on each said thicker portion would work, but this is not preferred.

If bonding or full-strength bonding is not required on all said thicker portions, selected regions only of the nip member can be provided with the protuberances, the other regions being smooth or recessed. For instance, the protuberances can be provided on a nip roller in circumferential or helical or transverse bands.

The height of the protuberances is preferably not less than the mean compressed thickness of the fabric (ie as measured in a test procedure in which the fabric is compressed between two planar platens and the distance between the platens is measured), and is preferably not less than the mean compressed diameter of the largest diameter fibres in the fabric (which diameter can be measured in the same way). The height of the protuberances will depend on the expected depths of softened or molten plastics material. The height may for example be not less than about 5% of said thicker portion; the height may for example be not more than about 20% of said thicker portion; the height may for example be about 10% of said thicker portion. The height is preferably not less than about 0.2 mm or 0.3 mm, or even not less than about 0.7 mm in some embodiments. In one preferred embodiment, the height is not more than about 0.6 mm or 0.5 mm; in another preferred embodiment, the height is not more than about 1.5 mm or 1 mm and may be about 1 mm or slightly less.

The machine direction (MD) and transverse direction (TD) pitch will depend on the MD and TD dimensions of the junctions. One or both pitches may for example be not less than about 15% or 20% of the extent in the respective direction of said thickened portion or of the softened or melted surface thereof; one or both pitches may for example be not more than about 45%, 50% or 60% of the extent in the respective direction of said thickened portion or of the softened or melted surface thereof. In a preferred embodiment, one or both pitches is not less than about 1.5 mm; in a preferred embodiment, one or both pitches is not more than about 3 mm.

It is desirable to be able to laminate a fabric and a mesh structure having a surface of similar softening or melting temperature, or even a fabric of a lower softening or melting temperature than the surface of the mesh structure. For instance, a polypropylene fabric/grid laminate can be used for asphalt reinforcement and the asphalt surface later recycled by being taken up, melted and re-laid. In such cases, in the method of the invention there may be some surface melting of the fabric fibres, but gross melting of the fabric structure should be avoided. This is achieved by the careful balance of the temperature of the fabric and the volume of softened or molten plastics material available on said thicker portions compared to the volume of fibres that it has enrobed. If there is too much softened or molten plastics material, it is possible that some unacceptable softening or some melting of the fabric fibres may occur; if there is too little, an inadequate bond will result; if there is roughly the right amount then, as the softened or molten plastics material enrobes each fibre, the skin of plastics material in contact with the fibre is chilled immediately to below its softening or melting temperature and below the softening or melting temperature of the fibre and there is an insufficient amount of molten plastics material between the fibres to reheat this skin to its softening or melting temperature. In practice, it has been found that when the softening or melting temperature of the fabric and of the mesh structure is the same, the machine has given a very robust process with no highly critical control limits.

Although the mesh structure is heated, it is found that the bond strength is further improved if the fabric is heated, eg before being brought into engagement with the mesh structure, as this reduces the chilling of the plastics material and enables the plastics material to penetrate further into the fabric or even to the other side of the fabric, even if the fabric has a similar or a lower softening or melting temperature relative to that of the surface of the mesh structure; this improves the enrobing of the fabric fibres with the plastics material of the mesh structure thicker portion. Normally in lamination it would not be necessary to pre-heat the second web being brought into contact with the molten surface of a first web because treatments can be applied to improve bonding or different adhesive properties can be provided on the surfaces. Pre-heating can for instance be effected by passing the fabric around a separate preheat roller and/or by heating said nip member and passing the fabric in contact with a significant length or arc of the nip member before it reaches the nip. The advantage of heating the nip member is that the temperature of the molten plastics material is kept as high as possible right through the pressing operation of the nip in order to ensure good engagement of the plastics material with the fibres of the fabric.

If desired, the laminate can be force cooled immediately after the nip.

The mesh structure is preferably heated before bringing it into engagement with the fabric. This enables one to use fabrics of similar or lower softening or melting temperature relative to that of the surface of the mesh structure. Nonetheless, if the fabric has a higher softening or melting temperature, it is possible to apply heat to the opposite face of the fabric when the fabric is in contact with the mesh structure, in order to heat the surface of the mesh structure thicker portions.

The mesh structure heating roller, and also the fabric pre-heat roller and/or the nip member if desired, can be heated by electric induction, for instance at 250 Hz, which enables the roller or member to be kept clean and avoids complicated pipe systems. The rollers or members can have any suitable non-stick surface.

Although the preferred material for both the mesh structure and the fabric is polypropylene, any suitable materials can be used, for instance high density polyethylene for the mesh structure and polyester for the fabric.

Said thicker portions may be nodes in the junctions of a biaxially-oriented mesh structure or parts (or nearly all) of the transverse bars of a uniaxially-oriented mesh structure.

The mesh structure could be a relatively light weight, small mesh pitch, biaxially oriented net, for instance made by stretching a starting material produced by one of the methods described in U.S. Pat. No. 2,919,467 (Mercer) or in U.S. Pat. No. 3,252,181 (Huteau). The machine would be cheap to build as a very small diameter heating roller could be used to heat the net; because of the small pitch, there would be no risk of the oriented strands contacting the hot roller. However, the invention has particular utility in heating larger mesh pitch mesh structures, eg having a machine direction (MD) mesh pitch of not less than about 25 mm or 30 mm, which mesh structures can be termed grids (or geogrids if for geoengineering use). Such grids may have a weight of not less than about 150 gms/m$^2$ though the weight depends on for instance the amount of transverse orientation, if any. Such grids can for instance be uniaxially or biaxially stretched grids made by one of the methods described in U.S. Pat. No. 4,374,798 (Mercer) or in U.S. Pat. No. 5,053,264 (Beretta). For very large MD pitch mesh structures, a very large heating roller would be required to keep the oriented strands out of contact with the hot roller, or alternatively a heated steel conveyor belt could be used for heating. In general, any suitable heating means can be used, preferably of the contact type which transfers heat to said thicker portions by conduction from a hot component moving at the same speed as the mesh structure.

The laminate of the invention can be used in any application where a lightweight or relatively weak fabric, generally non-woven, needs to be supported, for example, in filtration systems, in materials for erosion control, or in civil and other types of engineering applications where both the properties of a fabric and the properties of a high strength mesh structure or grid are required. By laminating the mesh structure to the fabric, installation may be greatly eased. A particular use of the laminate of the invention is in reinforcing a paved surface, as described in U.S. Pat. No. 5,152,633 (Mercer et al).

PREFERRED EMBODIMENT

Figure 2:
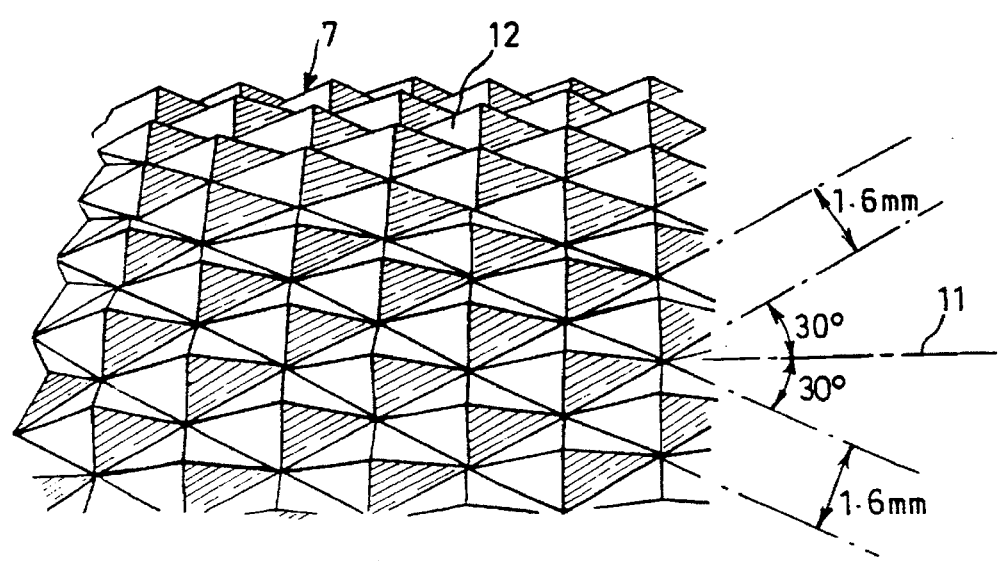

The invention will be further described, by way of example, with reference to the accompanying drawings, in which:

FIG. 1 which is a schematic vertical section through a machine for making a laminate in accordance with the invention; and FIG. 2 is an enlarged view of part of the surface of the upper nip roller.

FIG. 1 shows an example of a suitable laminating machine. A grid 1 is fed into the machine under controlled tension. After passing around an idler roller 2, it wraps around the surface of a heated roller or drum 3. The surface of the drum 3 is coated with a suitable wear resistant non-stick surface, for example, sintered polytetrafluoroethylene and stainless steel. The drum 3 is heated by means of an electrical inductance heater 4, the temperature of the drum 3 being measured by an infra-red pyrometer 5. The power output of the inductance heater 4 is controlled to maintain a constant drum temperature. On leaving the drum 3, the grid 1 passes between a backing member in the form of a lower nip roller 6 and a nip member in the form of an upper nip roller 7. The drum 3 and the lower nip roller 6 are driven at the same surface speed which is also the speed of the grid 1 passing through the machine. A fabric 8 is fed into the machine under controlled tension, passing first, if required, around a heated preheat roller 9 whose surface is maintained at a temperature below the softening or melting temperature of the fabric 8; the surface of the preheat roller 9 may be chromed. The fabric 8 then passes around the upper nip roller 7 and is brought into contact with the grid at the nip point between the nip rollers 7 and 6. The upper nip roller 7 may also be heated if required to maintain fabric temperature. The upper nip roller 7 has on its surface a suitable pattern of protuberances, for example, the knurling illustrated in FIG. 2. The upper nip roller 7 may be coated with a non-stick surface similar to that of the drum 3, to ensure that any molten polymer which penetrates the fabric 8 is carried away by the fabric 8 and does not remain on the roller 7 to build up and block the grooves. The lower nip roller 6 may, if required, be rubber covered.

The grid 1 is shown as a biaxially-oriented grid 1 having thicker nodes at its junctions, but it could be a uniaxially-oriented grid having thicker transverse bars. The surface of the nodes or bars of the grid 1 in contact with the drum 3 is softened or melted, the degree of softening or melting being controlled by the temperature of the drum 3, the tension of the grid 1 as it enters the machine, and the wrap angle of the grid 1 around the drum 3, which may be adjusted by altering the position of the roller 2. The diameter of the grid pre-heat drum 3 is sufficiently large to prevent contact between the drum surface and the oriented MD strands of grid 1 when the grid 1 is wrapped around the drum 3 under tension and when the oriented MD strands are pulled into straight lines between the junctions or nodes. The grid 1 enters the nip between the nip rollers 7 and 6 with the softened or melted surface of its nodes uppermost and the fabric 8 is pressed into this softened or melted surface by pressure between the nip rollers 7 and 6, causing the grid 1 and fabric 8 to laminate together. The laminate 10 leaves the machine and cools naturally.

In FIG. 2, the line 11 is parallel to the axis of the upper nip roller 7. The protuberances 12 are shown by way of example as diamond knurling where there are sets of grooves at a substantial angle to the axis of the roller 7, producing pyramid-shaped protuberances.

Example of Machine

Length of each nip roll 7, 9: 4700 mm.
Diameter of each nip roll 7, 9: 300 mm.
Length of heating drum 3: 4700 mm.
Diameter of heating drum 3: 1000 mm.
Protuberance height: 0.4 mm.
Protuberance pitches: about 2.7 mm MD, 1.6 mm TD (as in FIG. 2).
Protuberance profile: as in FIG. 2.

Example of Procedure

The grid is a biaxially-oriented polypropylene mesh structure made by the method described in U.S. Pat. No. 4,374,798.

Melting temperature of the plastics material: about 170° C.

Weight of grid per square meter: 200 g.
MD pitch of grid nodes: 65 mm.
TD pitch of grid nodes: 65 mm.
Thickness of grid nodes: 4.4 mm.
Thickness of grid strands: 0.8 mm.

The fabric is a polypropylene non-woven fabric, stitch-bonded using monofilament thread.

Melting temperature of the fabric: about 170° C.
Weight of fabric per square meter: 130 g.
Mean compressed thickness of fabric: 0.54 mm.
Diameter of largest fibres of the fabric: 0.14 mm.
Temperature of heating drum 3: 240° C.
Temperature of fabric pre-heat roller 9 and of upper nip roller 7: 120° C.
Area of node softened or melted: approximately 7 mm×7 mm.
Speed of advance of laminate 10: 4.7 m/sec.
Width of laminate: 3800 mm.

The present invention has been described above purely by way of example, and modifications can be made within the spirit of the invention.

We claim:

1. A method of making a laminate, comprising:
   providing a plastics material mesh structure having molecularly oriented strands connected together by thicker and non-oriented or less-oriented portions;
   providing a fabric for lamination to the mesh structure;
   heating the surfaces of said thicker portions of the mesh structure to soften or melt the surfaces of said thicker portions;
   subsequently passing the mesh structure and the fabric through a nip formed by a nip member and a backing member, to cause the softened or melted plastics material of said thicker portions to penetrate into the fabric; and
   cooling the laminate so formed;
   said nip member having surface protuberances which engage the opposite face of the fabric to that face of the fabric which engages the mesh structure, in general at least one protuberance engaging substantially each said thicker portion of the mesh structure where bonding is required.

2. The method of claim 1, wherein the height of the protuberances is not less than about the mean compressed thickness of the fabric.

3. The method of claim 1, wherein the height of the protuberances is not less than about the mean compressed diameter of the largest diameter fibres in the fabric.

4. The method of claim 1, wherein the height of the protuberances is not less than about 5% of said thicker portions of the mesh structure.

5. The method of claim 1, wherein said protuberances are in the form of discrete, small protuberances.

6. The method of claim 5, wherein said protuberances are formed by knurling.

7. The method of claim 1, wherein said protuberances are pyramid-shaped.

8. The method of claim 1, wherein the fabric is heated to a temperature less than that of the surfaces of said thicker portions.

9. The method of claim 1, wherein said nip member is heated to a temperature less than that of the softening or melting temperature of the fabric.

10. The method of claim 1, wherein the surfaces of said thicker portions are heated before bringing them into engagement with the fabric.

11. The method of claim 10, wherein the surfaces of said thicker portions are heated by engaging them with a hot component moving at the same speed as the mesh structure.

12. A method of making a laminate, comprising:
providing a plastics material mesh structure having oriented strands connected together by thicker and non-oriented or less-oriented portions;
providing a fabric for lamination to the mesh structure;
heating the surfaces of said thicker portions of the mesh structure to soften or melt the surfaces of said thicker portions;
passing the mesh structure and the fabric through a nip formed by a nip member and a backing member, to cause the softened or melted plastics material of said thicker portions to penetrate into the fabric; and
cooling the laminate so formed;
said nip member having surface protuberances which engage the opposite face of the fabric to that face of the fabric which engages the mesh structure, in general a plurality of said protuberances engaging substantially each said thicker portion of the mesh structure where bonding is required.

13. A method of making a laminate, comprising:
providing a plastics material mesh structure having molecularly oriented strands connected together by thicker and non-oriented or less-oriented portions;
providing a fabric for lamination to the mesh structure;
heating the surfaces of said thicker portions of the mesh structure to soften or melt the surfaces of said thicker portions;
subsequently passing the mesh structure and the fabric through a nip formed by a nip member and a backing member, to cause the softened or melted plastics material of said thicker portions to penetrate into the fabric; and
cooling the laminate so formed;
said nip member having surface protuberances which engage the opposite face of the fabric to that face of the fabric which engages the mesh structure, in general at least one protuberance engaging substantially each said thicker portion of the mesh structure where bonding is required, the softening or melting temperature of the fabric being approximately the same as or less than the softening or melting temperature of the surfaces of said thicker portions.

14. A method of making a laminate, comprising:
providing a plastics material mesh structure having molecularly oriented strands connected together by thicker and non-oriented or less-oriented portions;
providing a fabric for lamination to the mesh structure;
heating the surfaces of said thicker portions of the mesh structure to soften or melt the surfaces of said thicker portions;
subsequently passing the mesh structure and the fabric through a nip formed by a nip member and a backing member, to cause the softened or melted plastics material of said thicker portions to penetrate into the fabric; and
cooling the laminate so formed;
said nip member having surface protuberances which, after said surfaces have been softened or heated, engage the opposite face of the fabric to that face of the fabric which engages the mesh structure, in general at least one protuberance engaging substantially each said thicker portion of the mesh structure where bonding is required.

15. A method of making a laminate, comprising:
providing a plastics material mesh structure having molecularly oriented strands connected together by thicker and non-oriented or less-oriented portions;
providing a fabric for lamination to the mesh structure;
heating the surfaces of said thicker portions of the mesh structure to soften or melt the surfaces of said thicker portions;
passing the mesh structure and the fabric through a nip formed by a nip member and a backing member, to cause the softened or melted plastics material of said thicker portions to penetrate into the fabric; and
cooling the laminate so formed;
said nip member having surface protuberances which engage the opposite face of the fabric to that face of the fabric which engages the mesh structure, said protuberances having a height which is not more than about 20% of the thickness of said thicker portions, in general at least one protuberance engaging substantially each said thicker portion of the mesh structure where bonding is required.

16. A method of making a laminate, comprising:
providing a plastics material mesh structure having molecularly oriented strands connected together by thicker and non-oriented or less-oriented portions;
providing a fabric for lamination to the mesh structure;
heating the surfaces of said thicker portions of the mesh structure to soften or melt the surfaces of said thicker portions;
passing the mesh structure and the fabric through a nip formed by a nip member and a backing member, to cause the softened or melted plastics material of said thicker portions to penetrate into the fabric; and
cooling the laminate so formed;
said nip member having surface protuberances which engage the opposite face of the fabric to that face of the fabric which engages the mesh structure, in general at least one protuberance engaging substantially each said thicker portion of the mesh structure where bonding is required, the protuberances defining grooves therebetween, and the protuberances pressing the fabric into said softened or molten surfaces so that the fabric is tensioned between the adjacent pairs of protuberances and said softened or molten plastics material passes through the fabric into said grooves.

17. A method of making a laminate, comprising:

providing a plastics material mesh structure having molecularly oriented strands connected together by thicker and non-oriented or less-oriented portions;

providing a fabric for lamination to the mesh structure;

heating the surfaces of said thicker portions of the mesh structure to soften or melt the surfaces of said thicker portions;

subsequently passing the mesh structure and the fabric through a nip formed by a nip member and a backing member, to cause the softened or melted plastics material of said thicker portions to penetrate into the fabric; and cooling the laminate so formed;

said nip member having surface protuberances which engage the opposite face of the fabric to that face of the fabric which engages the mesh structure, the tip areas of the protuberances being substantially smaller than the respective said softened or melted surfaces so that the tip areas of the protuberances engage by way of the fabric with only small portions of the respective said softened or melted surfaces, in general at least one protuberance engaging substantially each said thicker portion of the mesh structure where bonding is required.

* * * * *